United States Patent
Levy

(10) Patent No.: US 12,189,789 B2
(45) Date of Patent: Jan. 7, 2025

(54) PROTECTING DISASTER RECOVERY SITE

(71) Applicant: VAST DATA LTD., Tel Aviv (IL)

(72) Inventor: Asaf Levy, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 383 days.

(21) Appl. No.: 17/452,400

(22) Filed: Oct. 26, 2021

(65) Prior Publication Data

US 2023/0126072 A1   Apr. 27, 2023

(51) Int. Cl.
  *G06F 7/04*   (2006.01)
  *G06F 21/60*  (2013.01)
  *H04N 7/16*   (2011.01)

(52) U.S. Cl.
  CPC .................... *G06F 21/60* (2013.01)

(58) Field of Classification Search
  CPC ........................................ G06F 21/60
  USPC ............................................ 726/26
  See application file for complete search history.

(56) References Cited

U.S. PATENT DOCUMENTS

2021/0081432 A1*  3/2021  Grunwald ............. G06F 16/273
2021/0191634 A1*  6/2021  Zafman ................. G06F 3/061

* cited by examiner

*Primary Examiner* — Brandon Hoffman
*Assistant Examiner* — Samuel Ambaye
(74) *Attorney, Agent, or Firm* — Reches Patents

(57) ABSTRACT

A method for protecting a disaster recovery site, the method may include receiving by source compute nodes of a storage system, during source storage periods, write requests for storing content in the storage system; writing by source compute nodes, during the source storage periods, the content into the storage nodes of the storage system; maintaining replication compute nodes of the storage system deactivated during the source storage periods; reading the content by the replication compute nodes from the storage nodes during replication periods; participating, by the replication compute nodes, in outputting the content to one or more data recovery sites during the replication periods; and maintaining the source compute nodes deactivated during the source storage periods.

21 Claims, 6 Drawing Sheets

PROTECTING DISASTER RECOVERY SITE

TECHNICAL FIELD

The present disclosure generally relates to the field of data storage, and more particularly to protecting a disaster recovery site.

BACKGROUND

A disaster recovery (DR) site is a backup facility that is often located in an entirely different location, separate from the primary data center, and can be used to recover and restore data when the primary data center becomes unavailable due to malicious attack or natural disaster.

For maintaining the relevance of the data stored in the DR site, replication is used for copying data from the primary site (also called source site) to the DR site.

In a case when the primary location becomes a target for a malicious attack, the DR site may also become vulnerable, as it is connected to the primary site via the replication links, which can be used for maliciously targeting the DR site as well.

There is a need to provide a DR replication without compromising the DR site's safety.

SUMMARY

There may be provide a storage system, a method and a non-transitory computer readable medium for protecting a disaster recovery site.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
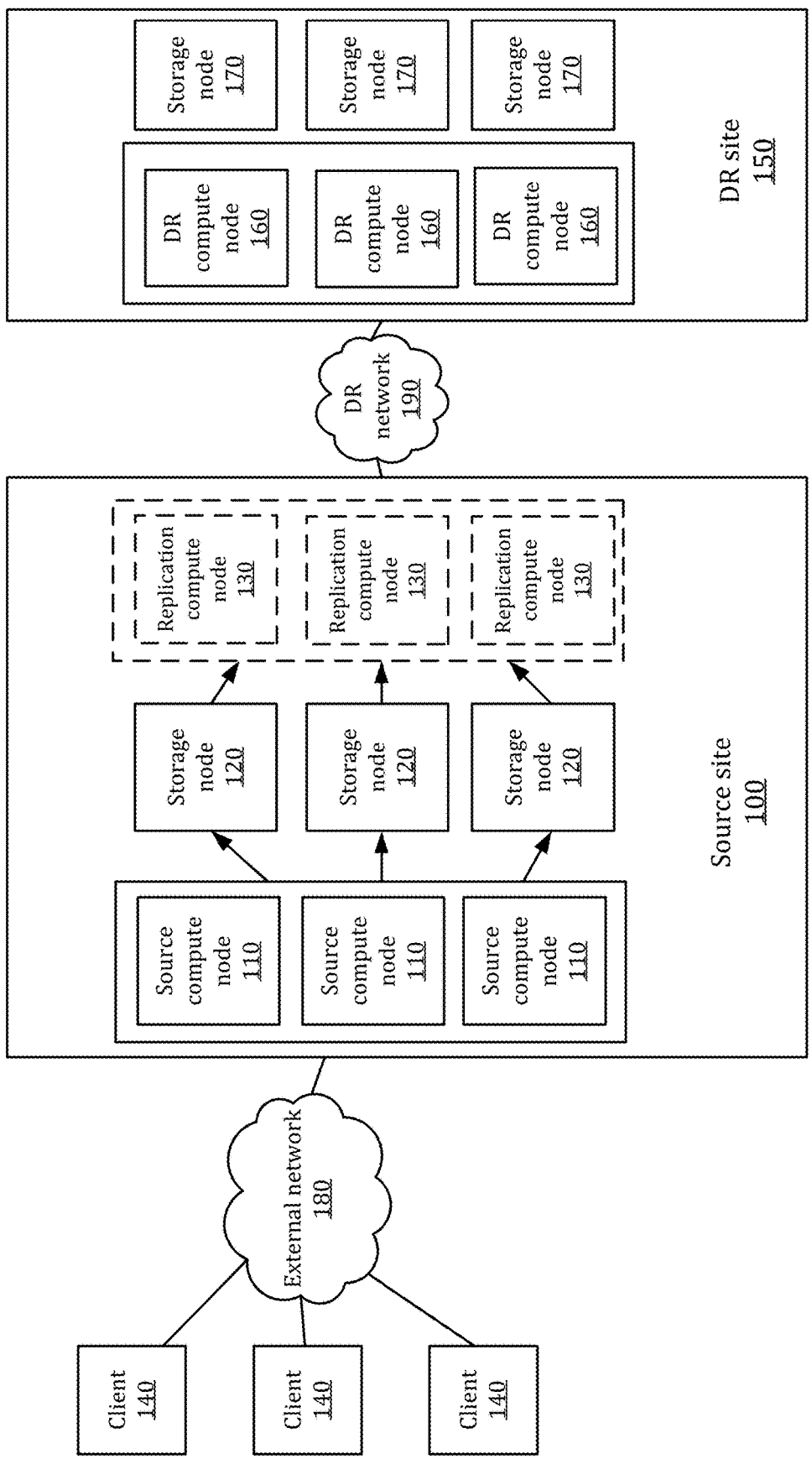
FIG. 1 illustrates an example of a source site, a DR site and their environment.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organ-ization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

The present storage system and methods provide protection for data stored in DR (disaster recovery) sites against malicious attacks, by creating a separation between processes related to locally storing data of received write requests and processes related to replicating the locally stored data to remote sites, thereby providing a complete separation between the DR sites and the external accessing entities that are coupled to the primary site.

The storage system is composed of a primary site and one or more DR sites. The primary site of the storage system is composed of compute nodes and storage nodes, where each compute node is assigned to function as either a source compute node or a replication compute node, thereby providing a source compute node group and a replication compute nodes group, each of the groups includes one or more compute nodes.

The compute nodes execute the logic (storage processes and algorithms) of the storage system and does not include storage means for storing any data or metadata. The storage nodes include storage devices and memories for storing, by the source compute nodes, the data and metadata of the storage system and are accessible to all the compute nodes, including any of the source compute nodes and the replication compute nodes.

The assignment of the roles of the compute nodes, as either source compute node or replication compute node, may be done statically, or dynamically according to the load imposed by the primary storing processes, the load imposed by the replication, the required latency for each of the processes, the required RPO (Recovery point objective), and the like.

The source compute nodes are coupled to client computers via an external network. The client computers may execute backup applications for backing up data in the storage system. The source compute nodes receive write requests for backing up data, and writes the data and any metadata, related to the data or related to internal processes, into storage devices within the storage nodes. The source compute nodes may take snapshots of the stored data, so as to freeze the stored data and to control versions to be synchronized with the DR site.

The storage nodes include storage and memory devices, such as SSD (Solid State Drive), hard drives, NVRAM (Non-volatile random-access memory), RAM (random-access memory), etc.

The compute nodes communicate with the storage nodes over a private network (that may be based on InfiniBand, ethernet fabric, etc.) that is only accessible to the compute nodes and the storage nodes, and is not accessible to client computers or any other external computers.

The replication compute nodes read the stored data and transmit the stored data to the DR sites, e.g., by communicating with compute nodes that belong to a cluster of nodes of a DR site.

According to embodiments of the invention, there is a temporal separation between the work handled by the source compute nodes and the work handled by replication compute nodes. There are ingest periods (source storage periods) dedicated to storing received data by the source compute nodes and there are replication periods dedicated to replicating the data that was stored since the previous replication period. During the ingest periods, only the source compute nodes are activated while the replication compute nodes are being disabled (e.g., shut down), and during the replication periods, only the replication compute nodes are activated while the source compute nodes are being disabled (e.g., shut down).

By separating the process of ingesting data and the process of replicating data, any malicious attack on the DR sites is avoided. During the ingest periods, when the source compute nodes may be vulnerable through the external network to possible malicious attacks, the replication compute nodes, that are the only entities connected to the DR sites, are non-operational, and therefore, there is no gate towards the DR sites. During the replication periods, the source compute nodes, that are the only entities connected to an external network, are non-operational, and therefore, there is no gate to the external world.

FIG. 1 illustrates a source site 100 and a DR site 150, and their environment, during a source storage period.

Source site 100 includes one or more storage nodes 120 and multiple compute nodes, such as source compute nodes 110 and replication compute nodes 130. Source compute nodes 110 are in communication with client computers 140 via an external network 180, that may be based, for example, on TCP/IP protocol or fabric protocols that serves as infrastructure to file protocols and I/O protocols. Source compute nodes 110 are further in communication with a first private network (such as first internal network 115 of FIG. 3) and with storage nodes 120.

Replication compute nodes 130 communicates with one or more DR sites 150 via a DR network 190, which may involve any combination of private and public links. Replication compute nodes 130 are also in communication with a second private network (such as second internal network 135 of FIG. 3) and with storage nodes 120.

The first private network and the second private network may be based, for example, on Infiniband or other fabric or internal networking technology that is preferably different from the networking technology of external network 180. The first and second private networks may be the same network, or may be different networks for further securing the communication.

DR site 150 includes one or more DR compute nodes 160 and one or more storage compute nodes 170, for storing the data received from source site 100.

In FIG. 1, source site 100 is illustrated as being during an ingest period, where the replication compute nodes 130 are non-operational, as indicated by the dashed lines, while source compute nodes 110 are operational and are enabled for receiving access requests from client computers 140, storing the data in storage nodes 120, taking snapshots, performing versioning of the stored data, etc. No replication is performed during the ingest period, and DR network 190 is not accessible, since the only entry to this network is via the replication compute nodes which are shut down upon starting the ingest period.

Figure 2:
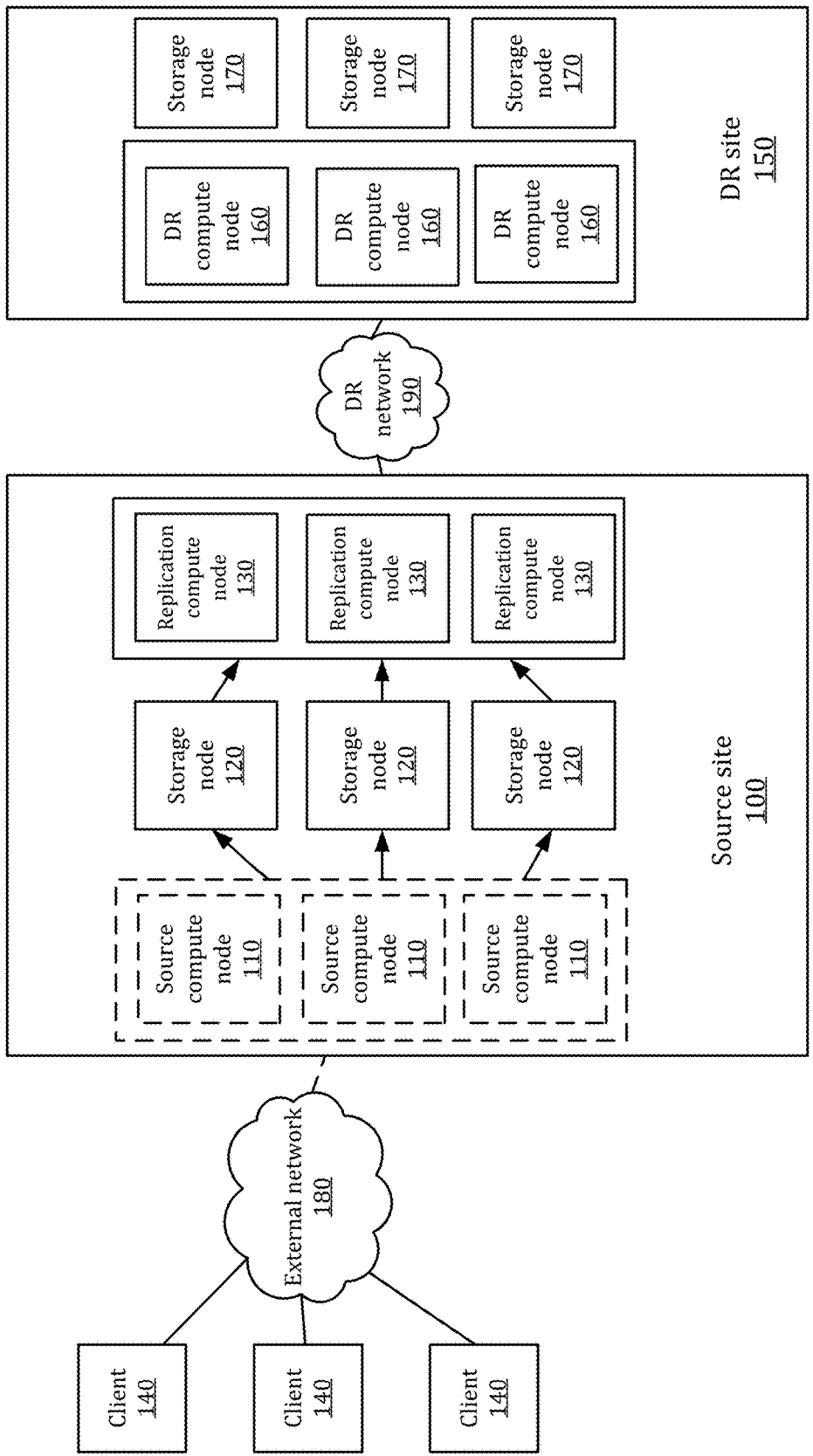
FIG. 2 illustrates an example of a source site, a DR site and their environment.

FIG. 2 illustrates source site 100 during a replication period, where the source compute nodes 110 are non-operational, as indicated by the dashed lines, while replication compute nodes 130 are operational and are enabled for reading new data from storage nodes 120, that was not yet replicated, and transmitting the data to DR compute nodes 160 of the DR site via DR network 190. No ingest of new data is performed during the replication period, since the source compute nodes are non-operational and does not receive data from the client computers. The entry point to the source site, via external network 180, is not accessible, since the source compute nodes are shut down upon starting the replication period.

The replication period is ended and the ingest period starts when the replication compute nodes are shut down and the source compute nodes are restarted. Optionally, the DR compute nodes may be also shut down during the ingest period, for further safety. The ingest period is ended and the replication period starts when the source compute nodes are shut down and the replication compute nodes are restarted.

The lengths of the ingest and replication periods may be determined statically or dynamically according to the load imposed by the primary storing processes, the load imposed by the replication, the required latency for each of the processes, the required RPO (Recovery point objective), and the like.

Optionally, the storage nodes are reinstalled and rebooted at the beginning of each replication period, for case there is any chance that their operating system or other software was hacked. Since the storage nodes does not include any complex logic, the reinstalling is instantaneous and does not harm stored data.

Figure 3:
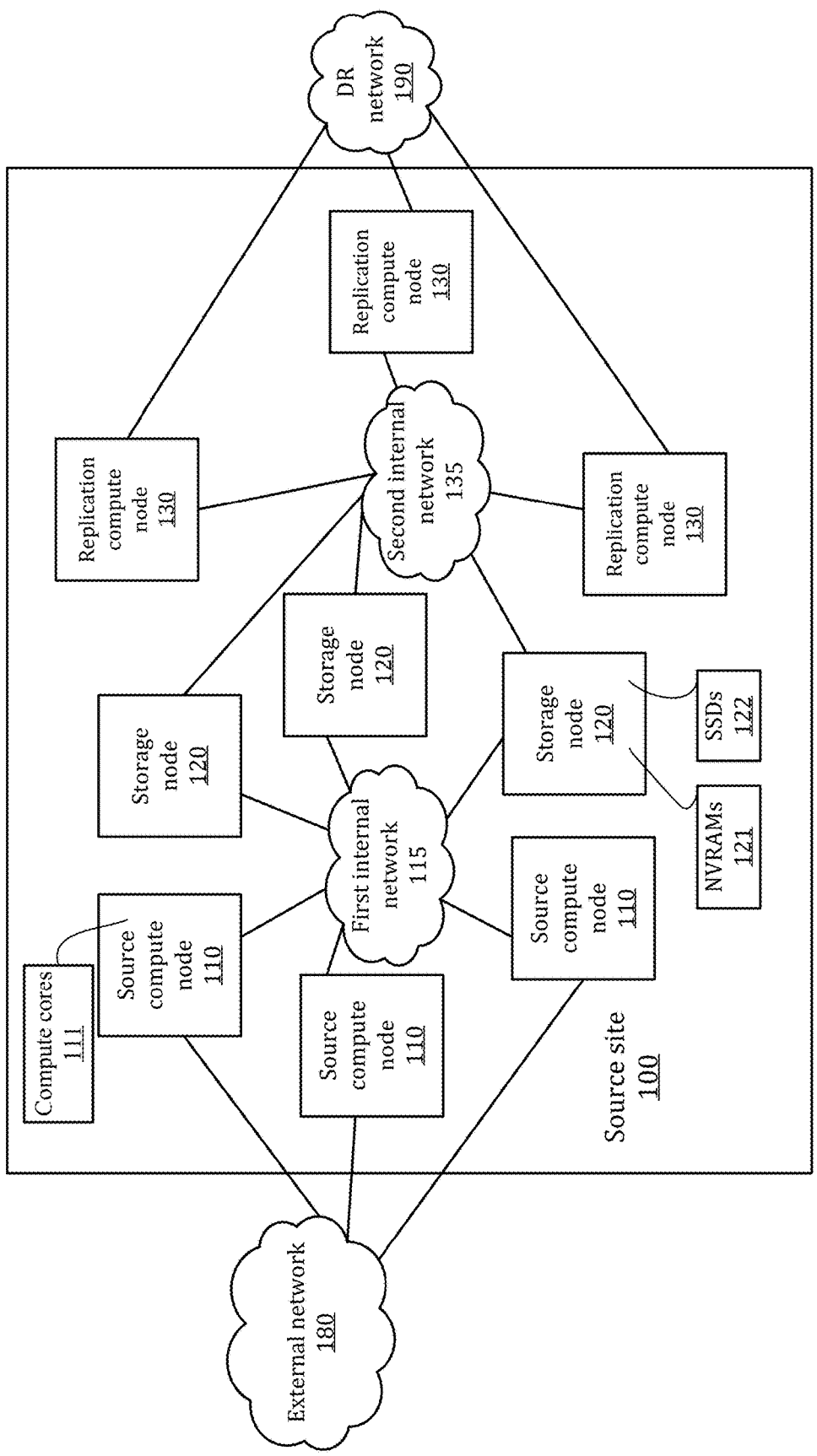
FIG. 3 illustrates an example of a source site.

FIG. 3 also illustrates that the source computer nodes 110 may include (or may execute) multiple compute cores 111 each. For simplicity of explanation only one of the source compute nodes 110 is shown as including the multiple computer cores. The same applies to the replication compute nodes 130.

In an embodiment, a source compute node 110 and/or a replication compute node 130 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute nodes 110, 130 and 160 may not require any dedicated hardware.

A source compute node 110 may be configured to receive requests (e.g., read or write requests) and promptly serve these requests in a persistent manner. The external network 180 may be, but is not limited to, the Internet, the world-wide-web (WWW), a local area network (LAN), a wide area network (WAN), and the like.

In an embodiment, a source compute node 110 is configured to interface with different protocols implemented by the client devices or applications (e.g., TCP/IP, HTTP, FTP, various filesystem protocols, etc.) and to manage the read and write operations to the storage nodes 120. The compute node 110 may be further configured to translate the protocol commands into a unified structure (or language). Then, each source compute node 110 is also configured to logically address and map all elements stored in the storage nodes 120.

The source compute nodes and/or the replication compute nodes may be configured to perform a number of processes including data reduction, data resiliency, and Flash memory management actions (e.g., defrag, wear leveling, and so on).

It should be noted that each source compute node 110 may operate in the same manner as all other source compute nodes 110. In a case of a failure, any source compute node 110 can replace the failed source compute node. Optionally, in a case of a failure of a replication compute node, it may be determined that one of the source compute nodes should change its functionality to a replication compute node and replace the failed replication compute node. Further, each source compute node may control and manage one or mode storage nodes 120 regardless of the specific architecture of the storage nodes 120. Therefore, there may be no coupling between specific source compute nodes 110 and specific storage nodes 120. As such, source compute nodes can be added to the system without increasing the number of storage nodes (or their capacity), and vice versa, storage nodes can be added without increasing the number of source compute nodes 110.

It should be noted that each replication compute node 130 may operate in the same manner as all other replication compute nodes 130. In a case of a failure, any replication compute node 130 can replace the failed replication compute node. Optionally, in a case of a failure of a source compute node, it may be determined that one of the replication compute nodes should change its functionality to a source compute node and replace the failed source compute node. Further, each replication compute node may control and manage one or mode storage nodes 120 regardless of the specific architecture of the storage nodes 120. Therefore, there may be no coupling between specific replication compute nodes 130 and specific storage nodes 120. As such, replication compute nodes can be added to the system without increasing the number of storage nodes (or their capacity), and vice versa, storage nodes can be added without increasing the number of replication compute nodes 130.

Any compute node may be allocated to operate as a source compute node or as a replication compute node. The allocation may change over time. The compute node may be rebooted before or after any change its allocation.

At a given point of time the number of source compute nodes may equal the number of replication source compute nodes or may differ from the number of the replication source compute nodes.

The storage nodes 120 provide the storage and state in the source site 100. To this end, each storage node 120 may include a plurality of SSDs, such as SSDs 122, and/or may include includes fast accessed memory for storing the traversal task queues, such as NVRAMs 121.

The storage nodes 120 may be configured to have the same capacity as each other or different capacities from each other. In an embodiment, the data stored in each storage node 120 is made redundant internally within the storage node, made redundant at a different storage node, or both.

A storage node 120 may be configured to communicate with the source compute nodes 110 and/or the replication compute nodes 130 over the first internal network 115. It should be noted that each compute node can communicate with each storage node 120 over the first internal network 115. There may not be a direct coupling between any compute node and any storage node 120.

In the embodiment, the first internal network 115 may include an Ethernet fabric, an InfiniBand fabric, and the like. Specifically, the first internal network 115 may enable communication protocols such as, but not limited to, remote direct memory access (RDMA) over Converged Ethernet (ROCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

Figure 4:
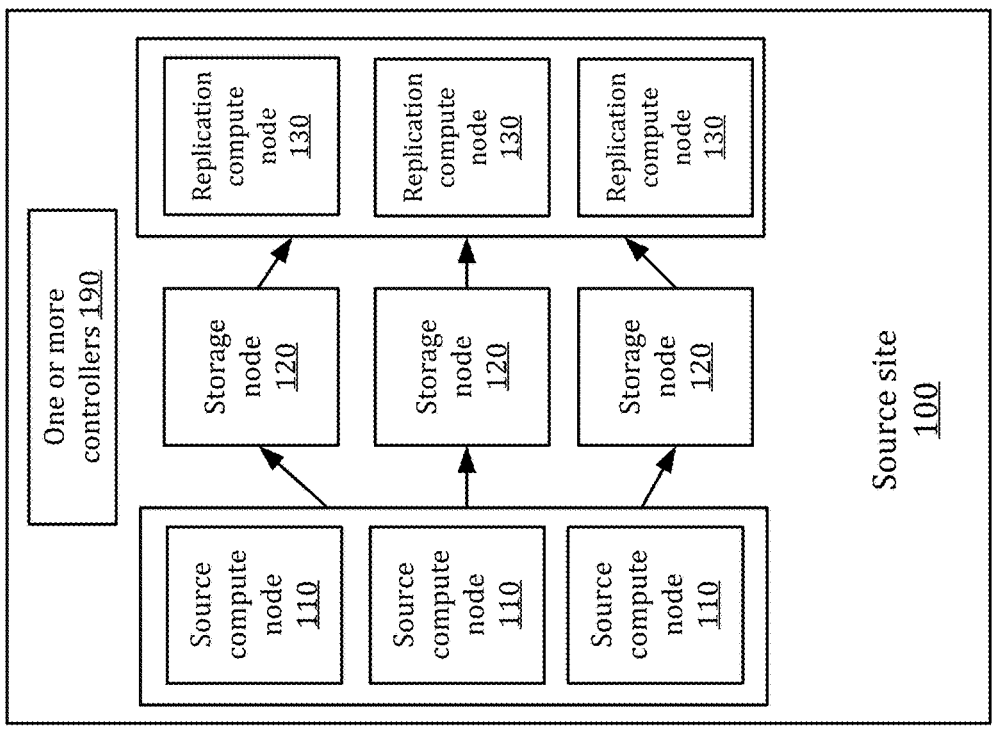
FIG. 4 illustrates an example of a source site.

FIG. 4 illustrates an example of source site 110 that includes one or more controllers 191 for controlling the activation and deactivation of the source nodes.

Figure 5:
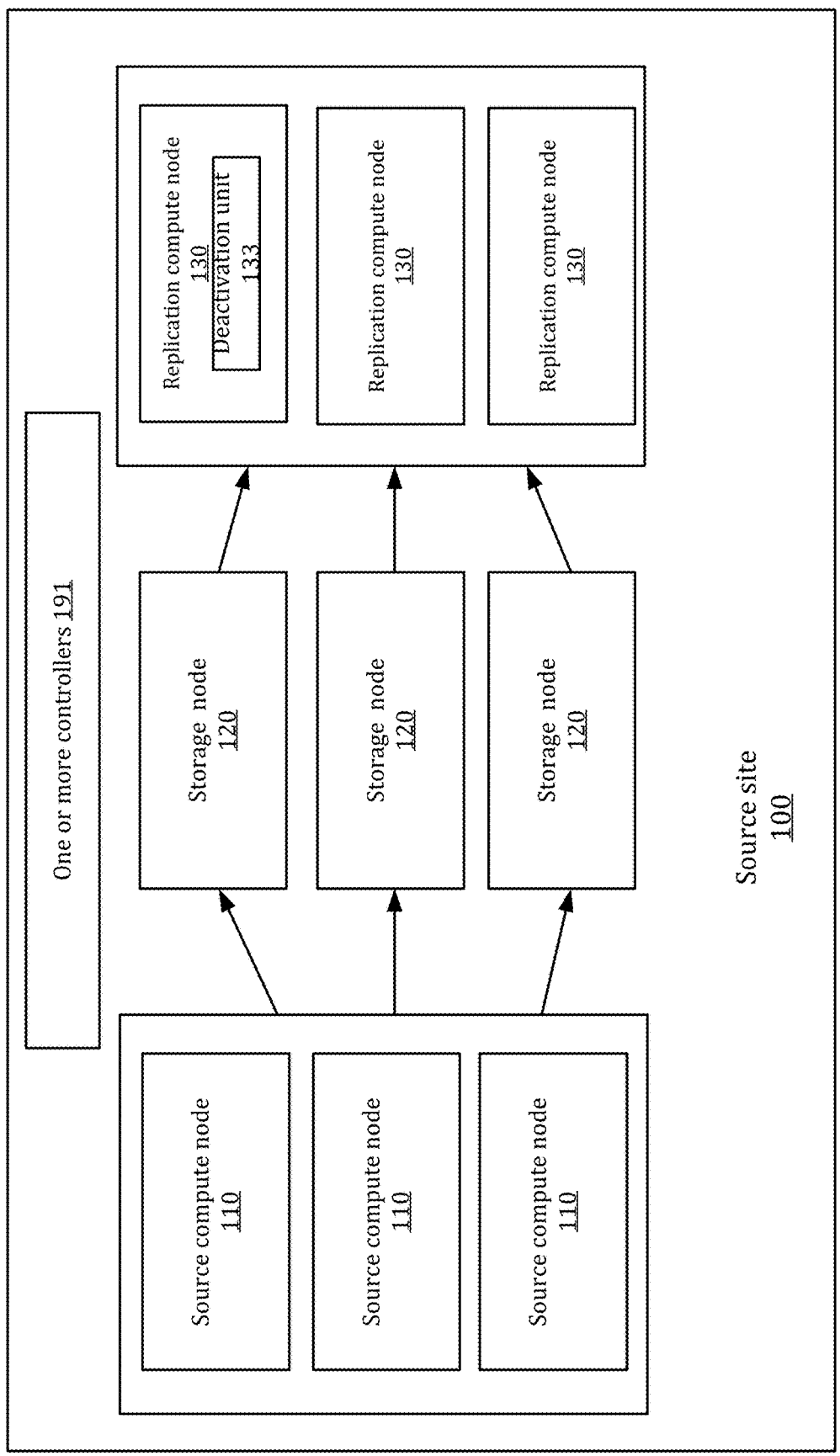
FIG. 5 illustrates an example of a source site.

FIG. 5 illustrates a replication compute node 130 as including a deactivation unit 133 for selectively activating and deactivating one or more compute nodes. Such a deactivation unit may be located within any other compute nodes. The deactivation unit 133 may remain active while other parts of the replication compute node 130 are inactivate.

Figure 6:
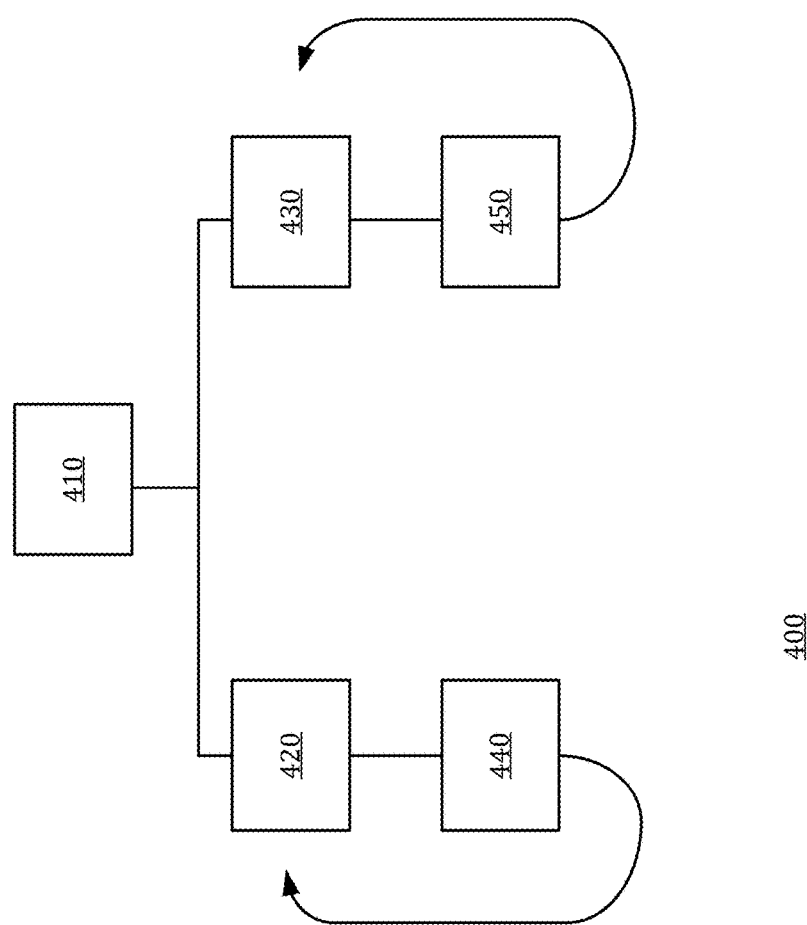
FIG. 6 is an example of a method.

FIG. 6 illustrates an example of a method 400.

Method 400 may be for protecting a disaster recovery site, the method may include initialization step 410. The initialization step 410 may be executed once per each period or only once-upon initialization of the storage system, may be triggered by an event, and the like.

The initialization step 410 may include determining which compute nodes of a storage system should be source compute nodes and which compute nodes should be replication compute nodes. The allocation may change over time (provide a dynamic allocation), may depend on the status (functional or faulty) of the compute nodes, may depend on the availability of resources of the compute nodes to perform replication and/or source functions, and the like.

Step 410 may be followed by step 420 of (a) receiving by source compute nodes of a storage system from client computers coupled to the storage system, during source storage periods, write requests for storing content in the storage system, and (b) writing by source compute nodes, during the source storage periods, the content into storage nodes of the storage system.

It should be noted that the writing may be executed, at least in part, during other periods that may differ from the source storage periods and from the replication periods. A time difference may or may not exist between the receiving and the writing. For example—when the source site operates to receive the content for backup purposes—there may be a significant time difference between the receiving and the writing.

Method 400 may also include step 430 of maintaining replication compute nodes of the storage system deactivated during the source storage periods.

Steps 420 and 430 may be followed by steps 440 and 450.

Step 440 may include (a) reading the content by the replication compute nodes from the storage nodes during replication periods, and (b) participating, by the replication compute nodes, in outputting the content to one or more data recovery sites during the replication periods.

The participating may include outputting by reading the content from the storage nodes and sending the content to at least one of output ports or communication units of the storage system. The participating may include sending the content to the one or more data recovery sites.

Step 450 may include maintaining the source compute nodes deactivated during the source storage periods.

The source compute nodes may be exposed to user computers that are external to the storage system, via an external network. The replication compute nodes may not be connected to the external network.

The deactivation of compute nodes provide a very strong isolation between the source compute nodes and the replication compute nodes—which exceeds the isolation provided by merely stopping communications—as stopping of communications can bypassed. The isolation may be further strengthened by verifying that computer nodes that should be deactivated are actually deactivated. Furthermore, since the compute nodes does not store any data within the compute nodes themselves, including control data and states that are all stored in the storage nodes, the initialization and deactivation of the compute nodes is very fast, since there is no need to persistently storing any cached or volatile stored data prior to shutting down, and there is no need to load data into memory upon activation.

The source compute nodes may be in communication with a first network that is at least in part external to the storage system and wherein the replication compute nodes are in communication with the one or more data recovery sites via a second network that is at least in part external to the storage system and differs from the first network.

Step 440 may start by or may be preceded by rebooting the storage nodes at beginnings of the replication period.

Steps 440 and 450 may be followed by steps 420 and 430—or may be followed by step 410.

The timing of execution of steps 420, 430, 440 and 450 may be controlled in various manners—for example by one or more controllers, by deactivation units, by the compute nodes themselves, and the like. Any controller and/or deactivation unit may belong to a compute node or may not belong to a compute node. A controller or a deactivation unit of a compute node main be maintained operating while other parts of a deactivated compute node are deactivated.

Accordingly—method 400 may include at least one of:
a. Deactivating, by a controller, replication compute nodes during the source storage periods; deactivating the source compute nodes during the replication periods, activating the replication compute nodes during the replication periods, and activating the source compute nodes during the source storage periods. The deactivating may include shutting down the source compute nodes during the replication periods, and shutting down the replication compute nodes during the source periods. The activation may include restarting the source compute nodes at the beginning of the source periods, and restarting the replication compute nodes at the beginning of the replication periods.
b. Selectively activating and deactivating one or more compute nodes by one or more deactivation units of one or more of the compute nodes.
c. Controlling, by a controller, a timing of the source storage periods and a timing of the replication periods.
d. Controlling, by at least some of the compute nodes, a timing of the source storage periods and a timing of the replication periods.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices inter-connected with each other in a suitable manner.

However, other modifications, variations and alternatives are also possible. The specifica-tions and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms de-scribe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A storage system, comprising:
   storage nodes; and
   compute nodes;
   wherein the compute nodes comprise:
   source compute nodes that are configured to (a) receive, from a user of the storage system, during source storage periods, write requests for storing content in the storage system, (b) write, during the source storage periods, the content into the storage nodes, and (c) avoid receiving the write requests during replication periods, wherein a configuration to avoid the receiving includes configuring the source compute nodes to remain non-operational during the replication periods; and
   replication compute nodes that are configured to (a) read the content from the storage nodes during the replication periods, (b) participate in outputting the content to one or more data recovery sites during the replication periods, and (c) avoid participating in outputting the content to the one or more data recovery sites during the source storage periods, wherein a configuration to avoid the participating includes configuring the replication compute nodes to remain non-operational during the source storage periods.

2. The storage system according to claim 1, wherein the source compute nodes are exposed to user computers that are external to the storage system, via an external network; wherein the replication compute nodes are not connected to the external network.

3. The storage system according to claim 1, wherein the replication compute nodes are configured to participate in the outputting by reading the content from the storage nodes and sending the content to at least one of output ports or communication units of the storage system.

4. The storage system according to claim 1, wherein the source compute nodes are in communication with a first network that is at least in part external to the storage system and wherein the replication compute nodes are in communication with the one or more data recovery sites via a second network that is at least in part external to the storage system and differs from the first network.

5. The storage system according to claim 1, wherein the storage nodes are configured to undergo a reboot process at beginnings of the replication period.

6. The storage system according to claim 1, comprising a controller that is configured to divide the compute nodes of the storage system into two groups: (i) a replication compute node group that includes compute nodes that to act as replication compute nodes, and (ii) a source compute node group that includes compute nodes that act as source compute nodes.

7. The storage system according to claim 1, comprising a controller that is configured to deactivate the replication compute nodes during the source storage periods, deactivate the source compute nodes during the replication periods, activate replication compute nodes during the replication periods, and activate the source compute nodes during the source storage periods.

8. The storage system according to claim 1, wherein at least some of the compute nodes comprise a deactivation unit for selectively activating and deactivating one or more compute nodes.

9. The storage system according to claim 1, comprising a controller that is configured to control a length of the source storage periods and to control a length timing of the replication periods.

10. The storage system according to claim 1, wherein at least some of the compute nodes are configured to control a length of the source storage periods and a length of the replication periods.

11. A method for protecting a disaster recovery site, the method comprises:
   receiving by source compute nodes of a storage system, from a user of the storage system, during source storage periods, write requests for storing content in the storage system;
   writing by source compute nodes, during the source storage periods, the content into storage nodes of the storage system;
   avoiding participating in outputting of the content to one or more data recovery sites during the source storage periods, wherein the avoiding of the participating includes maintaining replication compute nodes of the storage system in a non-operational mode during the source storage periods;

reading the content by the replication compute nodes from the storage nodes during replication periods;

participating, by the replication compute nodes, in outputting the content to one or more data recovery sites during the replication periods;

avoiding receiving the write requests from the user during the replication periods, wherein the avoiding of the receiving includes maintaining the source compute nodes in a non-operational mode during the replication periods.

12. The method according to claim 11, wherein the source compute nodes are exposed to user computers that are external to the storage system, via an external network; wherein the replication compute nodes are not connected to the external network.

13. The method according to claim 11, comprising participating, by the replication compute nodes, in the outputting by reading the content from the storage nodes and sending the content to at least one of output ports or communication units of the storage system.

14. The method according to claim 11, wherein the source compute nodes are in communication with a first network that is at least in part external to the storage system and wherein the replication compute nodes are in communication with the one or more data recovery sites via a second network that is at least in part external to the storage system and differs from the first network.

15. The method according to claim 11, comprising rebooting the storage nodes at beginnings of the replication period.

16. The method according to claim 11, comprising dividing the compute nodes into two groups: (i) a replication compute node group that includes compute nodes that act as replication compute nodes, and (ii) a source compute node group that includes compute nodes that act as source compute nodes.

17. The method according to claim 11, comprising deactivating, by a controller, replication compute nodes during the source storage periods; deactivating the source compute nodes during the replication periods, activating the replication compute nodes during the replication periods, and activating the source compute nodes during the source storage periods.

18. The method according to claim 11, comprising selectively activating and deactivating one or more compute nodes by one or more deactivation units of one or more of the compute nodes.

19. The method according to claim 11, controlling, by a controller, a length of the source storage periods and a length of the replication periods.

20. The method according to claim 11, comprising controlling, by at least some of the compute nodes, a length of the source storage periods and a length of the replication periods.

21. A non-transitory computer readable medium that stores instructions for:

receiving by source compute nodes of a storage system, from a user of the storage system, during source storage periods, write requests for storing content in the storage system;

writing by source compute nodes, during the source storage periods, the content into storage nodes of the storage system;

avoiding participating in outputting the content to one or more data recovery sites during the source storage periods, wherein the avoiding of the participating in outputting includes maintaining replication compute nodes of the storage system in a non-operational mode during the source storage periods;

reading the content by the replication compute nodes from the storage nodes during replication periods;

participating, by the replication compute nodes, in outputting the content to one or more data recovery sites during the replication periods; and avoiding the receiving of the write requests from the user during the replication periods, wherein the avoiding of the receiving includes maintaining the source compute nodes in a non-operational mode during the replication periods.

\* \* \* \* \*